(12) United States Patent
Harms

(10) Patent No.: US 12,498,412 B2
(45) Date of Patent: Dec. 16, 2025

(54) TEST AND/OR MEASUREMENT SYSTEM

(71) Applicant: Rohde & Schwarz GmbH & Co. KG, Munich (DE)

(72) Inventor: Julian Harms, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 311 days.

(21) Appl. No.: 18/233,074

(22) Filed: Aug. 11, 2023

(65) Prior Publication Data

US 2025/0052807 A1    Feb. 13, 2025

(51) Int. Cl.
*G01R 31/28*    (2006.01)
*G01R 27/32*    (2006.01)
(Continued)

(52) U.S. Cl.
CPC ......... *G01R 31/2822* (2013.01); *G01R 27/32* (2013.01); *G01R 35/007* (2013.01); *H04B 17/22* (2023.05)

(58) Field of Classification Search
CPC ...... H04B 17/21; H04B 17/0085; H04B 1/30; H04B 17/14; H04B 17/11; H04B 17/318;
(Continued)

(56) References Cited

U.S. PATENT DOCUMENTS

| | | |
|---|---|---|
| 10,386,444 B1 | 8/2019 | Stickle |
| 2006/0084426 A1* | 4/2006 | Anderson ............... G01R 27/28 455/423 |

(Continued)

*Primary Examiner* — Ajibola A Akinyemi
(74) *Attorney, Agent, or Firm* — DITTHAVONG, STEINER & MLOTKOWSKI

(57) ABSTRACT

The present disclosure relates to a test and/or measurement system. The test and/or measurement system comprises a base unit which comprises: an LO signal source configured to generate an LO signal, a first LO port and a second LO port, wherein the LO signal source is connected to the first LO port and the second LO port, and an LO measurement device. The test and/or measurement system further comprises: a first external frontend which is connected to the first LO port of the base unit via a first cable, and which is configured to receive a first fraction of the LO signal from the first LO port, wherein the first external frontend comprises one or more calibration standards; and a second external frontend which is connected to the second LO port of the base unit via a second cable, and which is configured to receive a second fraction of the LO signal from the second LO port, wherein the second external frontend comprises one or more calibration standards. The test and/or measurement system is operable in a calibration mode in which: the first external frontend is configured to connect the first LO port with one of its one or more calibration standards, the second external frontend is configured to connect the second LO port with one of its one or more calibration standards, and the LO measurement device is configured to measure: the LO signal which is generated by the LO signal source, a reflection of the first fraction of the LO signal received at the first LO port, and a reflection of the second fraction of the LO signal received at the second LO port.

19 Claims, 2 Drawing Sheets

(51) Int. Cl.
*G01R 35/00* (2006.01)
*H04B 17/21* (2015.01)

(58) Field of Classification Search
CPC ........ H04B 17/20; H04B 1/28; H04B 1/0475;
H04B 17/12; H04B 17/327; H04B 1/12;
H04B 17/101; H04B 1/40; H04B 17/29;
H04B 17/13; H04B 1/109
USPC ...................................................... 455/67.11
See application file for complete search history.

(56) References Cited

U.S. PATENT DOCUMENTS

| | | | | |
|---|---|---|---|---|
| 2006/0176975 | A1* | 8/2006 | Hsieh ....................... | H04B 1/30 |
| | | | | 375/285 |
| 2017/0288790 | A1* | 10/2017 | Haub ..................... | H04B 17/14 |

* cited by examiner

TEST AND/OR MEASUREMENT SYSTEM

TECHNICAL FIELD

The disclosure relates to a test and/or measurement system, such as a vector network analyzer (VNA), for testing and/or measuring the RF performance of a device-under-test (DUT).

BACKGROUND ART

A vector network analyzer (VNA) is a device for measuring the RF performance of a radio frequency device-under-test (DUT) or of an electrical network. The VNA can be used to characterize scattering parameters (S parameters) of the DUT.

Measurements with a VNA typically require a high accuracy and repeatability. However, different types of errors during such measurements can cause inaccuracies in the amplitude and phase of the measurement signals. For instance, systematic errors caused by non-ideal components in a VNA measurement setup, e.g. cable loss or impedance mismatch, can influence the measurement results.

Furthermore, for many applications it is beneficial if a measurement port of the VNA is as close as possible to DUT. In particular, long cables between the measurement port and the DUT should be avoided.

SUMMARY

Thus, there is a need to provide an improved test and/or measurement system, in particular an improved VNA, which avoid the above-mentioned disadvantages.

These and other objectives are achieved by the embodiments provided in the enclosed independent claims. Advantageous implementations of the present disclosure are further defined in the dependent claims.

According to an aspect, the disclosure relates to a test and/or measurement system. The test and/or measurement system comprises a base unit which comprises: an LO signal source configured to generate an LO signal, a first LO port and a second LO port, wherein the LO signal source is connected to the first LO port and the second LO port, and an LO measurement device. The test and/or measurement system further comprises: a first external frontend which is connected to the first LO port of the base unit via a first cable, and which is configured to receive a first fraction of the LO signal from the first LO port, wherein the first external frontend comprises one or more calibration standards; and a second external frontend which is connected to the second LO port of the base unit via a second cable, and which is configured to receive a second fraction of the LO signal from the second LO port, wherein the second external frontend comprises one or more calibration standards. The test and/or measurement system is operable in a calibration mode in which: the first external frontend is configured to connect the first LO port with one of its one or more calibration standards, the second external frontend is configured to connect the second LO port with one of its one or more calibration standards, and the LO measurement device is configured to measure: the LO signal which is generated by the LO signal source, a reflection of the first fraction of the LO signal received at the first LO port, and a reflection of the second fraction of the LO signal received at the second LO port.

This achieves the advantage that a modular test and/or measurement system is provided which can be used for testing and/or measuring the RF performance of a DUT. The DUT can thereby be connected to the two external frontends which can be located far away from the base unit but still receive essentially the same LO signal (or fractions thereof). The system can further be efficiently calibrated to enhance a drift stability and accuracy of LO signals at the frontends.

The test and/or measurement system can be a vector network analyzer (VNA) system. The base unit can be a (base) VNA.

The LO signal can be a clock signal and/or a reference signal, e.g. a signal with a clock or reference frequency, which is provided by the base unit.

The external frontends can comprise measurement ports which are connected to a DUT via, preferably short, connection lines. Thus, the external frontends allow to arrange the measurements ports closer to the DUT, especially compared to a conventional VNA where all ports and signal sources are arranged in a single unit which can is sometimes further away from the DUT.

For instance, the external frontends can comprise receiver modules which use the local oscillator signal from the base unit, e.g. heterodyne receivers. Therefore, the LO signal (or fractions thereof) can be distributed over several external frontends.

The reflection of the first fraction of the LO signal received at the first LO port can be a reflection from the first external frontend and/or from the first cable, and the reflection of the second fraction of the LO signal received at the second LO port can be a reflection from the second external frontend and/or from the second cable.

In an implementation form, the base unit is configured to determine, based on the measured LO signal and the measured reflections of the first and second fraction of the LO signal, correction values of: a phase drift in the first cable and in the second cable, and/or a relative phase drift between the first cable and the second cable. This achieves the advantage that the phase drifts in the cables are known and can be considered when performing a characterization measurement with the DUT. In this way, high drift stability in such a modular system with several external frontends connected to the DUT can be achieved.

In an implementation form, the test and/or measurement system is configured to sweep the LO signal generated by the LO signal source over a determined frequency range; wherein the base unit is configured to determine the correction values for predefined frequencies or frequency steps of the LO signal within the frequency range. This achieves the advantage that the correction values can be determined for various possible LO frequencies. For instance, the correction values can be stored in a memory of the base unit.

In an implementation form, the test and/or measurement system is operable in a measurement mode in which the test and/or measurement system is configured to calculate scattering parameters (S parameters) of a DUT; wherein the correction values are used to correct the scattering parameters.

In an implementation form, the base unit, the first external frontend and the second external frontend are arranged in separate housings.

In an implementation form, the base unit comprises a signal splitter which connects the LO signal source to the first LO port and the second LO port; wherein the signal splitter is configured to split the LO signal generated by the LO signal source into the first fraction and the second fraction of the LO signal.

The signal splitter can be configured to feed the first fraction of the LO signal to the first LO port and the second fraction of the LO signal to the second LO port.

In an implementation form, the LO measurement device comprises: a common directional coupler which is configured to decouple a part of the LO signal generated by the LO signal source; a first directional coupler which is configured to decouple a part of the reflection of the first fraction of the LO signal received at the first LO port; and a second directional coupler which is configured to decouple a part of the reflection of the second fraction of the LO signal received at the second LO port.

In an implementation form, the common directional coupler is arranged between the LO signal source and the signal splitter; the first directional coupler is arranged between the signal splitter and the first LO port; and the second directional coupler is arranged between the signal splitter and the second LO port.

In an implementation form, the LO measurement device is configured to determine a phase difference between the reflections of the first and second fraction of the LO signal based on an analysis of the decoupled parts of said reflections.

In an embodiment, the one or more calibration standards in the first external frontend and/or in the second external frontend comprise at least one calibration standard which is configured to reflect the respective LO signal fraction with a reflection coefficient that is larger than a threshold value.

For example, the calibration standard can be a short or an open calibration standard.

In an implementation form, the first external frontend comprises a switching unit which is settable to a first switching state in which it connects the first LO port to one of the calibration standards of the first external frontend; and/or the second external frontend comprises a switching unit which is settable to a first switching state in which it connects the second LO port to one of the calibration standards of the second external frontend.

In an implementation form, the first external frontend comprises at least one mixer, wherein the switching unit of the first external frontend is settable to a second switching state in which it connects the first LO port to the at least one mixer of the first external frontend; and/or the second external frontend comprises at least one mixer, wherein the switching unit of the second external frontend is settable to a second switching state in which it connects the second LO port to the at least one mixer of the second external frontend.

For example, the switching units of the first and second external frontend are set to the first switching state if the test and/or measurement system operates in the calibration mode and to the second switching state if the test and/or measurement system operates in the measurement mode.

In an implementation form, the first external frontend and the second external frontend comprise a respective DUT port which is arranged for being connected to a DUT.

For example, the first cable between the base unit and the first external frontend is longer than a cable connecting the first external frontend with the DUT, and/or the second cable between the base unit and the second external frontend is longer than a cable connecting the second external frontend with the DUT. Thus, the external frontends can be arranged relatively far away from the base unit and relatively close to the DUT. In this way, larger drift errors which occur in the longer cable connections between base unit and frontends can be determined in the calibration mode.

In an implementation form, the DUT port of the first external frontend is directly or indirectly connected to the at least one mixer of the first external frontend; and/or the DUT port of the second external frontend is directly or indirectly connected to the at least one mixer of the second external frontend.

In an implementation form, the base unit comprises a continuous wave (CW) signal generator for generating CW signals; and the base unit comprises at least a first and a second CW port, wherein the first CW port is connected to a respective CW port of the first external frontend, and wherein the second CW port is connected to a respective CW port of the second external frontend.

In an implementation form, the CW port of the first external frontend is connected to the at least one mixer of the first external frontend; and/or the CW port of the second external frontend is connected to the at least one mixer of the second external frontend.

In an implementation form, the base unit comprises a first receiver, wherein the first receiver is configured to measure and digitize a first CW signal which is forwarded from the CW signal generator to the first CW port and/or which is received at the first CW port; and/or the base unit comprises a second receiver, wherein the second receiver is configured to measure and digitize a second CW signal which is forwarded from the CW signal generator to the second CW port and/or which is received at the second CW port.

In this way, the test and/or measurement system can carry out an S-parameter characterization of the connected DUT.

In an implementation form, the test and/or measurement system comprises additional external frontends which are connected to additional LO ports of the base unit and which are configured to receive further fractions of the LO signal.

BRIEF DESCRIPTION OF THE DRAWINGS

The above described aspects and implementation forms of the present disclosure will be explained in the following description of specific embodiments in relation to the enclosed drawings, in which.

DETAILED DESCRIPTIONS OF EMBODIMENTS

Figure 1:
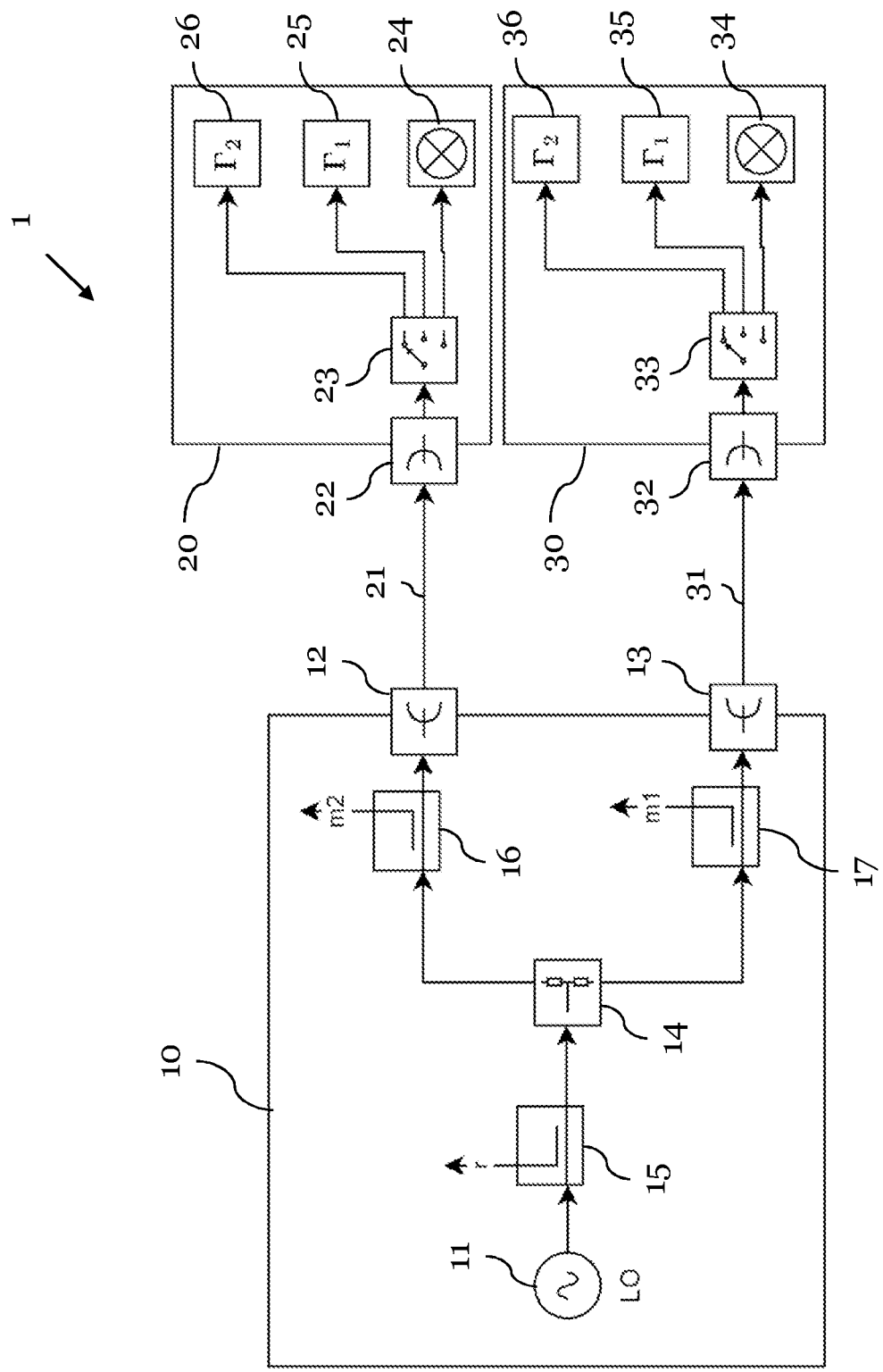
FIG. 1 shows a schematic diagram of a test and/or measurement system according to an embodiment.

FIG. 1 shows a schematic diagram of a test and/or measurement system 1 according to an embodiment. The test and/or measurement system 1 comprises a base unit 10, a first external frontend 20 and a second external frontend 30.

The base unit 10 comprises an LO signal source 11 configured to generate an LO signal, a first LO port 12 and a second LO port 13, wherein the LO signal source is connected to the first LO port 12 and the second LO port 13, and an LO measurement device.

The first external frontend 20 is arranged for being connected to the first LO port 12 of the base unit 10 via a first cable 21 and to receive a first fraction of the LO signal from the first LO port 12. The first external frontend 20 further comprises one or more calibration standards 25, 26 (also referred to as $\Gamma_1, \Gamma_2$ in FIG. 1). The second external frontend 30 is arranged for being connected to the second LO port 13 of the base unit 10 via a second cable 31 and to receive a second fraction of the LO signal from the second LO port 13.

The second external frontend 30 further comprises one or more calibration standards 35, 36 (also referred to as $\Gamma_1$, $\Gamma_2$ in FIG. 1).

The test and/or measurement system 1 is operable in a calibration mode in which: the first external frontend 20 is configured to connect the first LO port 12 with one of its one or more calibration standards 25, 26, and the second external frontend 30 is configured to connect the second LO port 13 with one of its one or more calibration standards 35, 36. In the calibration mode, the LO measurement device is further configured to measure: the LO signal which is generated by the LO signal source 11, a reflection of the first fraction of the LO signal received at the first LO port 12, and a reflection of the second fraction of the LO signal received at the second LO port 13.

The reflection of the first fraction of the LO signal received at the first LO port 12 can be a reflection from the first external frontend 20 and/or from the first cable 21, and the reflection of the second fraction of the LO signal received at the second LO port 13 can be a reflection from the second external frontend 30 end and/or from the second cable 31.

The measurement device can be configured to measure a respective phase and/or amplitude of the LO signal and the reflections of the first and second fraction of the LO signal.

The test and/or measurement system 1 can be a VNA or a VNA system. The VNA can be used to characterize a DUT, which is connected to the external frontends 20, 30 (not shown in FIG. 1). The VNA can be a multiport VNA which comprises at least two measurement ports for connecting the DUT.

The first and the second external frontends 20, 30 can each comprise an LO port 22, 32. The LO port 22 of the first external frontend 20 can be connected to the first LO port 12 of the base unit 10 via the first cable 21, and the LO port 32 of the second external frontend 30 can be connected to the second LO port 13 of the base unit 10 via the second cable 31, respectively.

The LO signal can have an LO reference frequency. This frequency can be adjustable by the LO signal source. The LO signal is preferably an electrical signal and the LO distribution (via ports 12, 22, 13, 32 and cables 21, 31) configured for electrical signals. However, alternatively the LO signal can also be an optical signal.

For example, an element (e.g., an LO port 12, 13) being connected to another element (e.g., a frontend 20, 30, or an LO signal source 11) refers to an electrical connection and/or communication connection between these elements, in particular, to a connection which is suitable to transmit signals (e.g., LO signals and/or CW signals) between the elements.

The test and/or measurement system 1 can comprise additional external frontends which are connected to additional LO ports of the base unit 10 and which receive fractions of the LO signal.

The test and/or measurement system 1 can be settable to the calibration mode or to a measurement mode by a user input, e.g., on an interface of the base unit 10.

For instance, the test and/or measurement system 1 can be a modular system, wherein the base unit 10, the first external frontend 20 and the second external frontend 30 are arranged in different (separate) housings which can be connected via cables. Furthermore, the base unit 10 can comprise of one or more housings.

The base unit 10 can be configured to determine correction values of a phase drift in the first cable 21 and/or in the second cable 31 based on the measured LO signal and the measured reflections of the first and second fraction of the LO signal. This determination can be carried out by a processor of the base unit 10 which receives the measured signals or information on the measured signals, preferably in a digitalized form. In this way, the base unit 10 can determine an absolute phase drift in the first and second cable 21, 31.

The correction values can be used for an active LO stabilization of the LO signal, e.g. during an S-parameter measurement with a DUT. This can enhance the drift stability of the system 1 and, thus, a measurement accuracy. In particular, a phase drift between the two or more frontends 20, 30 can be compensated efficiently. Especially transmitted scattering parameters can, thus, be measured more accurately.

Additionally or alternatively, the base unit 10 (or the processor of the base unit 10) can be configured to measure a relative phase drift between the first cable 21 and the second cable 31 (i.e., a difference between the phase drifts that occur in the first and second cable 21, 31).

The LO signal source 11 can be configured to sweep the frequency of the LO signal over a determined frequency range or frequency band. The base unit 10, in particular the processor, can be configured to determine the correction values for predefined frequencies or frequency steps within the frequency range or band.

The phase drifts and/or the correction values, which are determined in the calibration mode, can be stored in a memory of the base unit 10 (e.g., a flash memory).

The test and/or measurement system 1 can be operated in a measurement mode, in which S-parameters measures are carried out with a DUT that is connected to the frontends 20, 30. Thereby, scattering parameters of the DUT can be calculated. The previously determined correction values can be used to correct these scattering parameters, e.g. to compensate and/or reduce errors which stem from unwanted phase shifts of LO signals that occur in the first and second cable 21, 31.

The base unit 10 may comprise a signal splitter 14 (or signal splitter unit) which connects the LO signal source 1 with the first and second LO port 12, 13. The signal splitter 14 can be configured to split the LO signal which is generated by the LO signal source 11 into the first fraction and the second fraction. The first and the second fraction of the LO signal can be identical, in particular can have identical amplitude and/or phase, when reaching the first and second LO port 12, 13 respectively.

The LO measurement device can comprise a number of directional couplers 15, 16, 17 which are configured to decouple (meaning: couple out) parts of the LO signal generated by the LO signal source 11 respectively parts of the reflections of the LO signal fractions received at the LO ports 12, 13. The coupled-out (or decoupled) parts can be forwarded to one or more amplitude and/or phase measurement units of the LO measurement device (not shown in FIG. 1) and/or to a processor of the base unit 10 which are configured to determine the amplitude and/or phase of the LO signal and of the received reflections of the LO signal fractions based on the coupled-out signal parts. In an example, each directional couplers 15, 16, 17 comprises a respective amplitude and/or phase measurement unit which can be connected to the processor of the base unit 10.

For instance, a common direction coupler 15 is arranged between the LO signal source 11 and the signal splitter 14 and is configured to forward a decoupled (i.e., coupled-out) part of the LO signal (signal r). Furthermore, a first directional coupler 16 is arranged in front of the first LO port 12

(e.g., between signal splitter 14 and first LO port 12) and can be configured to forward a decoupled (i.e., coupled-out) part of the reflection of the first fraction of the LO signal received at the first LO port 12 (signal m1). Likewise, a second directional coupler 17 can be arranged in front of the second LO port 13 (e.g., between signal splitter 14 and second LO port 13) and can be configured to forward a decoupled (i.e., coupled-out) part of the reflection of the second fraction of the LO signal received at the second LO port 12 (signal m2).

Thus, first directional coupler 16 can measure the part of the LO signal that is received by the first LO port 12 and fed into the base unit 10, and the second directional coupler 17 can measures the part of the LO signal that is received by the second LO port 13 and fed into the base unit 10.

Alternatively, instead of the directional couplers 15, 16, 17 signal splitters can be arranged in the base unit 10.

Based on the measurements of the coupled-out parts of the signals, the phase difference or phase shift that occurs in the first and second cable 21, 31 and, thus, the correction values for S-parameter characterization can be determined. For instance, the LO measurement device can be configured to measure a phase difference between the reflections of the first and second fraction of the LO signal.

The one or more calibration standards 25, 26 in the first external frontend 20 and/or the one or more calibration standards 35, 36 in the second external frontend 30 can each comprise at least one calibration standard which is configured to reflect the respective LO signal fraction with a reflection coefficient that is larger than a threshold value. For instance, this calibration standard can be a short or an open calibration standard. This "high reflection" calibration standard can be connected to the first respectively second LO port 12, 13 of the base unit 10 if the system 1 is operated in the calibration mode.

In this way, the LO signal fractions can be efficiently reflected back to the first and second LO ports 12, 13 of the base unit 10 for determining the correction values.

The calibration standards 25, 26, 35, 36 of the frontends 20, 30 can comprise additional calibration standards for carrying out calibration measurements, e.g., a load, a match and/or a through calibration standard.

Furthermore, each external frontend 20, 30 can comprise a respective switching unit 23, 33 which is configured to selectively connect the first respectively the second LO port 12, 13 to one of the calibration standards 25, 26, 35, 36 of the frontends 20, 30 if the test and/or measurement system is in calibration mode. The switching units 23, 33 can be controllable switches.

In this way, several impedance states at the LO input of the external frontends 20, 30, can be switched and measured in cascade with the connection cables 21, 31. For instance, thereby a ratio of the measured signals m_x/r (e.g., m1/r or m2/r) in amplitude and/or phase can be evaluated. By measuring all n ratios (for all frontends) repeatedly, time drift effects, which can be caused by the connection cables, can be detected and compensated for.

In addition, each external frontend 20, 30 can comprise at least one mixer 24, 34 (or mixer unit). The switching unit 23, 23 of each external frontend 20, 30 can be configured to connect the first respectively second LO port 12, 13 to the mixer 24, 34 of the external frontend 20, 30 if the test and/or measurement system 1 operates in the measurement mode (or a "normal operation mode". The mixers 24, 34 can further receive a CW signal which is converted to an IF signal using the LO signal fraction, as will be explained below.

Figure 2:
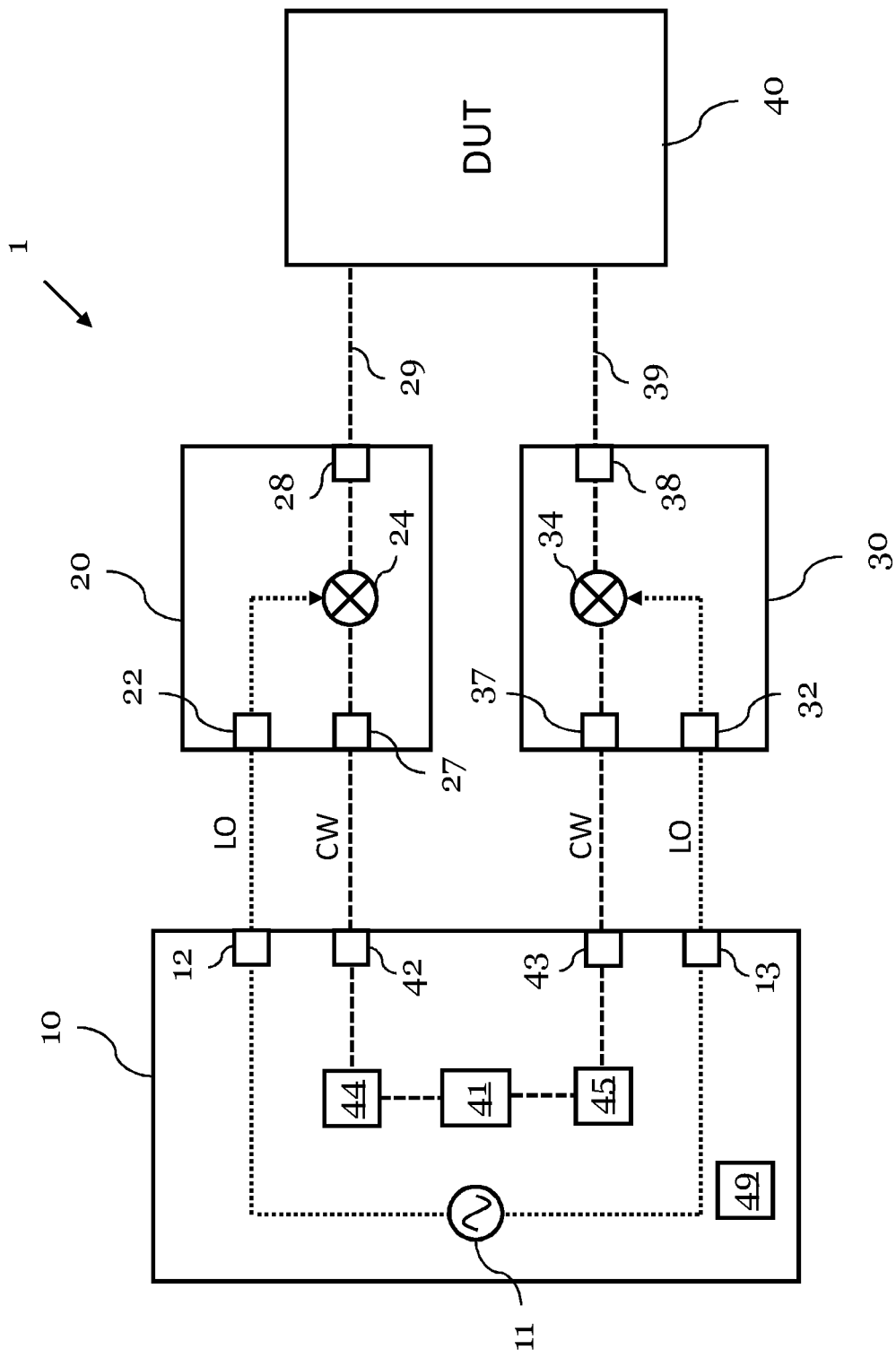
FIG. 2 shows a schematic diagram of a test and/or measurement system according to an embodiment.

FIG. 2 shows a schematic diagram of the test and/or measurement system 1 according to an embodiment. As shown in FIG. 2 the at least two external frontends 20, 30 can be connected to a DUT 40 via respective DUT ports 28, 38. In this arrangement, an S-parameter characterization of the DUT 40 can be carried out. The DUT ports 28, 38 can be measurement ports of the system 1.

The DUT 40 can be an RF device under test. For example, the DUT 40 is an active device (e.g., a communication device) or a passive device (e.g., a cable or a filter).

For instance, the external frontends 20, 30 being separate modules (i.e., separate from the base unit 10) allows to arrange them as close as 0,00000000000000000 possible to the DUT 40, i.e., minimizing the length of the connection lines 29, 39 which connect the frontends 20, 30 to the DUT. This is preferable for many VNA applications. The connection cables 21, 31, which connect the external frontend modules 20, 30 to the base unit 10, can be much longer than the cables 29, 39. The high length of the first and second cable 29, 39 can be compensated by the calibration of the system 1.

The DUT ports 28, 38 of the first and second external frontend 20, 30 can be directly or indirectly connected to the respective at least one mixer 24, 34. For instance, the connection between the respective DUT port 28, 38 and mixer 24, 34 can be an indirect connection via a coupler or a direct connection via a direct element (e.g., direct connection line).

As shown in FIG. 2, the base unit 10 may further comprise a continuous wave (CW) signal generator 41 for generating CW signals, e.g. a first and a second CW signal. The base unit 10 may further comprise at least a first and a second CW port 42, 43, wherein the first CW port 42 is connected to a respective CW port 27 of the first external frontend 20, and wherein the second CW port 43 is connected to a respective CW port 37 of the second external frontend. In this way, CW signals can be forwarded from the base unit to the external frontends 20, 30.

The CW port 27 of the first external frontend 20 can be connected to the at least one mixer 24 of the first external frontend 20, and the CW port 37 of the second external frontend 30 can be connected to the at least one mixer 34 of the second external frontend 30.

Thus, the respective mixers 24, 34 of the first and second external frontend 20, 30 can each receive a CW signal and an LO signal (fraction) from the base unit 10. The mixers can use the LO signal to convert the CW signal to an IF signal (e.g., by mixing the CW signal with the LO signal). The IF signal can then be forwarded to the DUT via the respective DUT ports 28, 38 (or measurement ports) of the frontends 20, 30.

In this way, the S-parameter characterization of the DUT 40 can be carried out. Thereby, the correction values, which are determined in calibration mode, can be used to compensate absolute or relative phase shifts in the cables, in particular in the first and second cable 21, 31 between the base unit 10 and the frontends 20, 30.

The base unit 10 may further comprises a first receiver 44 which is configured to measure and digitize a first CW signal which is forwarded from the CW signal generator 41 to the first CW port 42 and/or which is received at the first CW port 42. Likewise, the base unit 10 may comprises a second receiver 45 which is configured to measure and digitize a second CW signal which is forwarded from the CW signal generator 41 to the second CW port 43 and/or which is received at the first CW port 43. The first and second receiver 41, 44 can be connected to a processor of the base unit 10, which can receive the digitalized CW signals from the receivers 44, 45 for further processing. The CW receivers 44, 45 can be separate from the LO measurement device 49.

The first receiver 44 may comprise a first and second direction coupler (for the transmitted CW signal and the reflected CW signal), a mixer for downconverting of the first CW signal (transmitted or reflected), a first and a second ADC, and an optional filter (e.g., an analog filter and/or a digital filter). Likewise, the second receiver 45 may comprise a first and second direction coupler (for the transmitted CW signal and the reflected CW signal), a mixer for downconverting of the second CW signal (transmitted or reflected), a first and a second ADC, and an optional filter (e.g., an analog filter and/or a digital filter).

The base unit 10 may comprise more than two CW ports 42, 43 and/or more than two LO ports 12, 13. In that case three, four or more external frontends can be connected to the base unit 10. The calculation of the scattering parameters can be carried out by the processor in the base unit 10 or by a computing unit, such as a FPGA, DSP or PC.

All features described above or features shown in the figures can be combined with each other in any advantageous manner within the scope of the disclosure.

The invention claimed is:
1. A test and/or measurement system, comprising:
a base unit which comprises:
an LO signal source configured to generate an LO signal,
a first LO port and a second LO port, wherein the LO signal source is connected to the first LO port and the second LO port, and
an LO measurement device;
a first external frontend which is connected to the first LO port of the base unit via a first cable, and which is configured to receive a first fraction of the LO signal from the first LO port, wherein the first external frontend comprises one or more calibration standards;
a second external frontend which is connected to the second LO port of the base unit via a second cable, and which is configured to receive a second fraction of the LO signal from the second LO port, wherein the second external frontend comprises one or more calibration standards;
wherein the test and/or measurement system is operable in a calibration mode in which:
the first external frontend is configured to connect the first LO port with one of its one or more calibration standards,
the second external frontend is configured to connect the second LO port with one of its one or more calibration standards, and
the LO measurement device is configured to measure: the LO signal which is generated by the LO signal source, a reflection of the first fraction of the LO signal received at the first LO port, and a reflection of the second fraction of the LO signal received at the second LO port.

2. The test and/or measurement system of claim 1, wherein the base unit is configured to determine, based on the measured LO signal and the measured reflections of the first and second fraction of the LO signal, correction values of: a phase drift in the first cable and in the second cable, and/or a relative phase drift between the first cable and the second cable.

3. The test and/or measurement system of claim 2, wherein the test and/or measurement system is configured to sweep the LO signal generated by the LO signal source over a determined frequency range; wherein the base unit is configured to determine the correction values for predefined frequencies or frequency steps of the LO signal within the frequency range.

4. The test and/or measurement system of claim 2, wherein the test and/or measurement system is operable in a measurement mode in which the test and/or measurement system is configured to calculate scattering parameters of a DUT; wherein the correction values are used to correct the scattering parameters.

5. The test and/or measurement system of claim 1, wherein the base unit, the first external frontend and the second external frontend are arranged in separate housings.

6. The test and/or measurement system of claim 1, wherein the base unit comprises a signal splitter which connects the LO signal source to the first LO port and the second LO port;
wherein the signal splitter is configured to split the LO signal generated by the LO signal source into the first fraction and the second fraction of the LO signal.

7. The test and/or measurement system of claim 6, wherein the common directional coupler is arranged between the LO signal source and the signal splitter;
wherein the first directional coupler is arranged between the signal splitter and the first LO port; and
wherein the second directional coupler is arranged between the signal splitter and the second LO port.

8. The test and/or measurement system of claim 1, wherein the LO measurement device comprises:
a common directional coupler which is configured to decouple a part of the LO signal generated by the LO signal source;
a first directional coupler which is configured to decouple a part of the reflection of the first fraction of the LO signal received at the first LO port; and
a second directional coupler which is configured to decouple a part of the reflection of the second fraction of the LO signal received at the second LO port.

9. The test and/or measurement system of claim 7, wherein the LO measurement device is configured to determine a phase difference between the reflections of the first and second fraction of the LO signal based on an analysis of the decoupled parts of said reflections.

10. The test and/or measurement system of claim 1, wherein the one or more calibration standards in the first external frontend and/or in the second external frontend comprise at least one calibration standard which is configured to reflect the respective LO signal fraction with a reflection coefficient that is larger than a threshold value.

11. The test and/or measurement system of claim 1, wherein the first external frontend comprises a switching unit which is settable to a first switching state in which it connects the first LO port to one of the calibration standards of the first external frontend; and/or
wherein the second external frontend comprises a switching unit which is settable to a first switching state in which it connects the second LO port to one of the calibration standards of the second external frontend.

12. The test and/or measurement system of claim 11, wherein the first external frontend comprises at least one mixer, wherein the switching unit of the first external frontend is settable to a second switching state in which it connects the first LO port to the at least one mixer of the first external frontend; and/or wherein the second external frontend comprises at least one mixer, wherein the switching unit of the second external frontend is settable to a second switching state in which it connects the second LO port to the at least one mixer of the second external frontend.

13. The test and/or measurement system of claim 12, wherein the DUT port of the first external frontend is directly or indirectly connected to the at least one mixer of the first external frontend; and/or wherein the DUT port of the second external frontend is directly or indirectly connected to the at least one mixer of the second external frontend.

14. The test and/or measurement system of claim 1, wherein the first external frontend and the second external frontend comprise a respective DUT port which is arranged for being connected to a DUT.

15. The test and/or measurement system of claim 12, wherein the CW port of the first external frontend is connected to the at least one mixer of the first external frontend; and/or wherein the CW port of the second external frontend is connected to the at least one mixer of the second external frontend.

16. The test and/or measurement system of claim 14, wherein the first cable between the base unit and the first external frontend is longer than a cable connecting the first external frontend with the DUT, and/or wherein the second cable between the base unit and the second external frontend is longer than a cable connecting the second external frontend with the DUT.

17. The test and/or measurement system of claim 1, wherein the base unit comprises a continuous wave (CW) signal generator for generating CW signals; and wherein the base unit comprises at least a first and a second CW port, wherein the first CW port is connected to a respective CW port of the first external frontend, and wherein the second CW port is connected to a respective CW port of the second external frontend.

18. The test and/or measurement system of claim 17, wherein the base unit comprises a first receiver, wherein the first receiver is configured to measure and digitize a first CW signal which is forwarded from the CW signal generator to the first CW port and/or which is received at the first CW port; and/or wherein the base unit comprises a second receiver, wherein the second receiver is configured to measure and digitize a second CW signal which is forwarded from the CW signal generator to the second CW port and/or which is received at the second CW port.

19. The test and/or measurement system of claim 1, wherein the test and/or measurement system comprises additional external frontends which are connected to additional LO ports of the base unit and which are configured to receive further fractions of the LO signal.

* * * * *